UNITED STATES PATENT OFFICE 2,658,047

VINYL CHLORIDE POLYMERS PLASTICIZED WITH CYANOETHYL ETHERS OF S-(2-ARYLETHYL)-2-MERCAPTOETHANOLS

Joachim Dazzi, Dayton, Ohio, assignor to Monsanto Chemical Company, St. Louis, Mo., a corporation of Delaware No Drawing. Application May 8, 1952,
Serial No. 286,830

2 Claims. (Cl. 260—30.8)

This invention relates to organic compounds and deals more particularly with new nitriles, to a method of producing the same and to vinyl chloride polymers plasticized with the new nitriles.

An object of the present invention is the provision of new nitriles. A further object is the preparation of new and useful compounds. Still another object of the invention is the provision of efficient plasticizers for vinyl chloride polymers. Other objects will appear hereinafter.

These objects are accomplished by the following invention wherein acrylonitrile is reacted with an S-(2-arylethyl)-2-mercaptoethanol to yield new addition products substantially according to the scheme:

Ar.CH₂.CH₂.S.CH₂.CH₂OH+CH₂:CHCN→
ArCH₂CH₂SCH₂CH₂OCH₂CH₂CN in which Ar is a member of the group consisting of phenyl, naphthyl and xenyl radicals and the alkyl derivatives thereof in which the alkyl group has up to 20 carbon atoms.

One class of nitriles provided by the invention and having the general formula shown above includes the S-(2-alkyl-phenyl(ethyl-2-(2-mercaptoethoxy)propionitriles having the general formula:

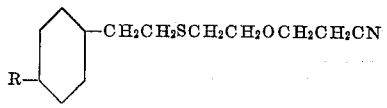

in which R is a member of the group consisting of hydrogen and alkyl radicals having up to 20 carbon atoms. As illustrative of this class may be mentioned S - [2 - (4 - isopropylphenyl)ethyl] - 2 - (2 - mercaptoethoxy)propionitrile and S - (2 - phenylethyl) - 2 - (2 - mercaptoethoxy) - propionitrile.

Another class of nitriles provided by the invention includes naphthalene derivatives having the general structure:

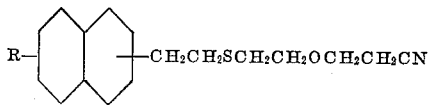

in which R is a member of the group consisting of hydrogen and alkyl radicals having up to 20 carbon atoms. An example of this class of compounds is S - [2 - (α - naphthyl)ethyl] - 2 - (2 - mercaptoethoxy)propionitrile.

As illustrative of S - (2 - arylethyl) - 2 - mercaptoethanols which may be reacted with acrylonitrile according to the invention may be mentioned:

S-(2-phenylethyl)-2-mercaptoethanol
S-[2(4-ethylphenyl)ethyl]-2-mercaptoethanol
S-[2(o-tolyl)ethyl]-2-mercaptoethanol
S - [2(3 - isoamylphenyl)ethyl] - 2 - mercaptoethanol
S - [2(4 - n - octylphenyl)ethyl] - 2 - mercaptoethanol
S - [2(4 - tert - dodecylphenyl)ethyl] - 2 - mercaptoethanol
S-[2(α-naphthyl)ethyl]-2-mercaptoethanol
S-[2(4-xenyl)ethyl]-2-mercaptoethanol The S - (2 - arylethyl) - 2 - mercaptoethanols employed in the present invention are readily available compounds which are prepared by reaction of 2-mercaptoethanol with styrene or other vinyl-substituted aromatic or alkyl-aromatic hydrocarbons. I have found that in the presence of a basically reacting agent or catalyst, acrylonitrile adds readily and smoothly to the S - (2 - arylethyl) - 2 - mercaptoethanols to give good yields of the hitherto unknown S-(2-arylethyl) - 2 - (2 - mercaptoethoxy)propionitriles as shown in the above reaction scheme.

Depending upon the nature of the individual mercaptoethanol and of the basic agent employed, the addition reaction may occur under varying conditions of temperature and pressure. However, since the reaction is exothermic, for optimum yields it is advantageous in many instances to employ external cooling in order to prevent or minimize possible side reactions, e. g., polymerization. The present addition products are prepared by simply contacting the arylethylmercaptoethanol with the acrylonitrile in the presence of a basically reacting material as a catalyst, for a time of, say, one to twenty-four hours. Basically reacting materials which may be employed include alkali and alkali metal hydroxides, e. g., sodium, potassium, lithium, calcium, or magnesium hydroxide; basically reacting salts such as sodium carbonate, potassium acetate, alkali or alkali metal alcoholates such as sodium methylate, organic bases such as pyridine, quaternary ammonium salts or bases, etc. While I prefer to use as a catalyst a material which is soluble in the arylethylmercaptoethanol, such solubility of the catalyst in the initial reactants is not a necessary property of the catalyst.

Inasmuch as molecular equivalents of the arylethylmercaptoethanol and acrylonitrile are involved in the formation of the present addition products, it is advantageous to employ stoichiometric proportions of the two reactants. If desired, however, any excess of either reactant may be employed, since any unreacted material is readily separated from the product. Although I find that generally no extraneous solvent or diluent need be employed in the addition reaction, inert solvents or diluents may be used and are of particular advantage when working with the higher molecular weight arylethylmercaptoethanols, i. e., naphthyl- or xenylethylmercaptoethanols or derivatives of phenylethylmercaptoethanol in which the phenyl radical is substituted with a higher alkyl group, i. e., an alkyl group of, say, from 8 to 20 carbon atoms.

The present S-(2-arylethyl)-2-(2-mercaptoethoxy)propionitriles are stable, high boiling viscous products which may be advantageously employed in the chemical and allied industries, for a wide variety of purposes. They are of general utility as plasticizers for synthetic resins and plastics, particularly for vinyl chloride polymers, to which polymers they confer a high degree of flexibility even at very low temperatures. Derivatives of S-(2-phenylethyl)-2-(2-mercaptoethoxy)propionitrile in which the phenyl ring has at least one alkyl substituent of from 8 to 20 carbon atoms may be advantageously employed as synthetic lubricants. S-(2-phenylethyl)-2-(2-mercaptoethoxy)propionitrile and its nuclearly alkylated derivatives are also useful as insecticides, fungicides and biological toxicants in general.

The S-(2-arylethyl)-2-(2-mercaptoethoxy)-propionitriles are of particular importance as plasticizers for vinyl chloride polymers. A wide variety of plasticizers has been employed for the purpose of improving the physical properties of vinyl chloride polymers. Particular attention has been given to the improvement of flexibility and heat and light stability of such plasticized compositions. In many instances the improvement in flexibility has been obtainable only by sacrificing other desirable properties of an ideal polyvinyl chloride composition. I have found that very good flexibility is imparted to vinyl chloride polymers when the present products are employed as plasticizers for such polymers.

The S-(2-arylethyl)-2-(2-mercaptoethoxy)-propionitriles are valuable plasticizers for polyvinyl chloride and copolymers of at least 70 per cent by weight of vinyl chloride and up to 30 per cent by weight of an unsaturated monomer copolymerized therewith, for example, vinyl acetate, vinylidene chloride, etc. The present nitriles impart great flexibility to vinyl chloride polymers at very low temperatures; they are compatible with such polymers, and show no exudation of plasticizer even at plasticizer content of up to 50 per cent. Although the quantity of plasticizer will depend upon the particular polymer to be plasticized and upon its molecular weight, it is generally found that compositions having from 5 per cent to 50 per cent by weight of plasticizer will, in most cases, be satisfactory for general utility. The good flexibility of the plasticized compositions increases with increasing plasticizer concentration.

In evaluating plasticizer efficiency use is made of the following empirical testing procedures:

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized composition's usefulness as an elastomer.

*Water resistance.*—The amount of water absorption and the amount of leaching that takes place when the plasticized composition is immersed in distilled water for 24 hours is determined.

The invention is further illustrated, but not limited, by the following examples:

Example 1

1.3 g. of sodium methylate was added to 1.3 moles of S-(2-phenylethyl)-2-mercaptoethanol and the mixture was stirred at a temperature of from 65° C. to 75° C. until the sodium methylate had dissolved. The mixture was then cooled to 20° C. and 1.3 moles of acrylonitrile was gradually added to it while stirring. Although the reaction was noted to be somewhat exothermic, no external cooling was employed. The reaction mixture was stirred overnight, and then diluted with 200 ml. of water. After neutralizing the diluted mixture with 8 per cent hydrochloric acid, ether was added and the resulting mixture was allowed to separate. In order to obtain any possibly residual product in the water layer, it was extracted with ethylene dichloride. The ether layer and the ethylene dichloride extract were combined and submitted to distillation under reduced pressure. The fraction, B. P. 160 to 182° C./2 mm. of Hg thus obtained was redistilled to give 225 g. (86.5 per cent yield) of the substantially pure S-(2-phenylethyl)-2-(2-mercaptoethoxy)propionitrile, B. P. 177 to 185° C./1 to 2 mm. of Hg, $n_D^{25}=1.53785$, and analyzing as follows:

|  | Calcd. for $C_{13}H_{17}ONS$ | Found |
| --- | --- | --- |
| Percent S | 13.61 | 13.54 |
| Percent N | 5.95 | 5.82 |

Other S-(2-arylethyl)-2-(2-mercaptoethoxy)-propionitriles, e. g., S-[2-(4-tolyl)ethyl]-2-(2-mercaptoethoxy)propionitrile, S-[2-(α-naphthyl)ethyl]-2-(2-mercaptoethoxy)propionitrile, S-[2-(α-naphthyl)ethyl]-2-(2-mercaptoethoxy)propionitrile, or S-[2-(4-xenyl)ethyl]-2-(2-mercaptoethoxy)-propionitrile may be similarly prepared.

Example 2

60 parts of polyvinyl chloride and 40 parts by weight of S-(2-phenylethyl)-2-(2-mercaptoethoxy)propionitrile are mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 48° C. When subjected to heat at a temperature of 325° F. for a period of 30 minutes the clarity and color of the molded product were substantially unchanged. Tests of the water-resistance properties of the plasticized material employing the test procedure described above showed a solids-loss of 2.04 per cent and a 1.29 per cent water absorption value.

Instead of the nitriles employed in the examples above, other S-(2-arylethyl)-2-(2-mercaptoethoxy)propionitriles give similarly valuable plasticized polyvinyl chloride compositions. Thus, by employing 40 parts by weight of S-[2-(4-ethylphenyl)ethyl], the S-[2-(4-n-octylphenyl)ethyl] or the S-[2-(4-dodecylphenyl)-ethyl]-2-(2-mercaptoethoxy)propionitrile with 60 parts by weight of polyvinyl chloride or with 60 parts by weight of a vinyl chloride vinyl acetate copolymer known to the trade as "Vinylite," there may be obtained clear, colorless compositions of very good flexibility and stability.

While the above examples show only a composition in which the ratio of plasticizer to polymer content is 40:60, this ratio being employed in order to get comparable efficiencies, the content of nitrile to polyvinyl chloride may be widely varied, depending upon the properties desired in the final product. For many purposes a plasticizer content of, say, from only 10 per cent to 20 per cent is preferred. The present nitriles are compatible with polyvinyl chloride over a wide range of concentrations, up to 30 per cent of nitrile based on the total weight of the plasticized composition yielding desirable products.

Although the invention has been described particularly with reference to the use of the present S-(2-arylethyl)-2-(2-mercaptoethoxy)propionitriles as plasticizers for polyvinyl chloride, these nitriles are advantageously employed also as plasticizers for copolymers of vinyl chloride, for example the copolymers of vinyl chloride with vinyl acetate, vinylidene chloride, methyl methacrylate, acrylonitrile, butadiene, or styrene. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present nitriles are substantially unreactive with the commercially available heat and light stabilizers which are commonly employed with polyvinyl chloride or copolymers thereof, the presence of such additions in the plasticized materials does not impair the valuable properties of the present nitriles. The present nitriles are of general utility in softening vinyl chloride polymers. They may be used as the only plasticizing component in a compounded vinyl chloride polymer or they may be used in conjunction with other plasticizers.

This is a continuation-in-part of my application, Serial No. 158,077, filed April 25, 1950, now issued as U. S. Patent No. 2,617,819, dated November 11, 1952.

What I claim is:

1. A resinous composition comprising polyvinyl chloride plasticized with a nitrile having the general formula

$ArCH_2CH_2SCH_2CH_2OCH_2CH_2CN$ in which Ar is a member of the group consisting of phenyl, naphthyl and xenyl radicals and monoalkyl-substituted phenyl radicals, monoalkyl-substituted naphthyl radicals and monoalkyl-substituted xenyl radicals in which the alkyl group has up to 20 carbon atoms, said nitrile being from 5 to 50 per cent of the weight of the composition.

2. A resinous composition comprising polyvinyl chloride plasticized with S-(2-phenylethyl)-2-(2-mercaptoethoxy)-propionitrile, said nitrile being from 5 to 50 per cent of the weight of the composition.

JOACHIM DAZZI.

No references cited.